INVENTORS
GÜNTER KEGELMANN
HORST GEBLER
WALTER SEIFRIED

BY Bryan and Butrum
ATTORNEYS

3,580,798
BIAXIALLY STRETCHED TRIOXANE COPOLYMER FILM AND PROCESS FOR THE PREPARATION THEREOF

Gunter Kegelmann, Neustadt an der Weinstrasse, and Horst Gebler and Walter Seifried, Wiesbaden-Biebrich, Germany, assignors to Kalle Aktiengesellschaft, Wiesbaden-Biebrich, Germany
Filed Apr. 23, 1969, Ser. No. 818,531
Claims priority, application Germany, Apr. 26, 1968, P 17 69 257.8
Int. Cl. C08f 15/12; C08g 1/04; D01d 5/12
U.S. Cl. 161—165      4 Claims

ABSTRACT OF THE DISCLOSURE

The invention relates to a biaxially stretched film and process for the preparation thereof, the film being a high molecular weight linear trioxane/ethylene oxide copolymer having stabilized end groups and containing 80 to 99.9 percent by weight of trioxane based on the total weight of the polymer, the film exhibiting a sag of less than 0.2 percent characteristic for a flat film, a deviation in thickness of less than ±6 percent from the average thickness, an elastic modulus in all directions of the film plane of at least 300 kg./mm.$^2$, an ultimate tensile strength above 15 kg./mm.$^2$ at an elongation at rupture of less than 100 percent, and a shrinkage capacity, at 140° C., of less than 5 percent.

---

Figure 1A:
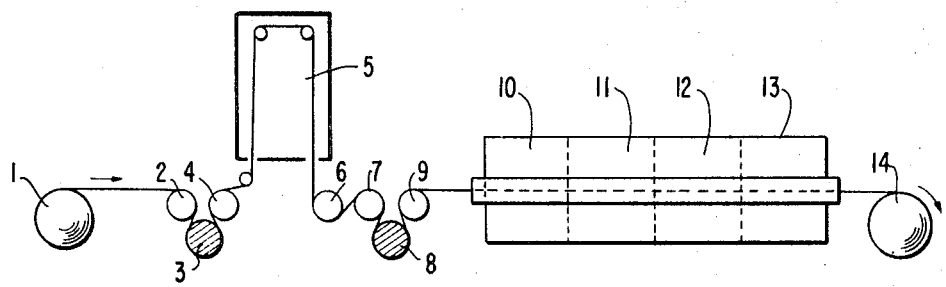

The present invention relates to a biaxially stretched film of improved flatness consisting of high molecular weight linear trioxane/ethylene oxide copolymers having stabilized end groups and containing 80 to 99.9 percent by weight, preferably 90 to 99.9 percent by weight, based on the total weight of the polymer, of trioxane, and to a process for the production of such film.

Copolymers of this type are known to possess physical properties which are excellently suited to many applications, such as high strength, good surface hardness and stiffness, combined with great toughness and abrasion resistance. These properties are of great interest for many applications of films, e.g. in all cases where a combination of good stiffness and good resistance to abrasion are required.

However, the production of stretched films of polyoxymethylenes is considerably impeded by the tendency of the material to form spherulites, which can be overcome only to a limited degree by a treatment with rollers or calenders.

It is also known to produce films of polyoxymethylene by the tube stretching method with simultaneous stretching in both directions. However, films produced in this manner do not satisfy the highest demands such as are made for technical purposes as regards flatness and uniformity of thickness.

The present invention provides a biaxially stretched film of trioxane copolymers which satisfies the requirements for technical purposes while fully utilizing the advantages of the material.

This is achieved by means of a biaxially stretched film of high-molecular weight linear trioxane/ethylene oxide copolymers having stabilized end groups and containing 80 to 99.9 percent by weight, preferably 90 to 99.9 percent by weight, based on the total weight of the copolymer, of trioxane, which film displays a sag of less than 0.2 percent characteristic for flat films.

Besides a sag of less than 0.2 percent, the film according to the present invention exhibits deviations from its average thickness of less than ±6 percent, an elastic modulus in all directions of the film surface of at least 300 kg./mm.$^2$, ultimate tensile strengths above 15 kg./mm.$^2$ at an elongation at rupture of less than 100 percent, and a shrinkage, at 140° C., of less than 5 percent.

The sag characteristic of a flat film is measured at a film web which is suspended under a tension of 0.1 kg./mm.$^2$ between two parallel rollers which have a diameter of 40 mm. and a distance from each other of 2 m. The smallest and the largest sag transversely to the film web are measured, and from these values the relative difference in the longitude of the film is calculated which is the cause of the sagging.

The uniformity of thickness is determined in the usual manner by measuring the film point-by-point across its width by means of mechanical calipers.

The elastic modulus is determined at a temperature of 23° C. and a relative humidity of 50 percent, using an electronically recording tension tester. For this purpose, a sample strip having a width of 15 mm. and a clamping length of 200 mm. is stretched at an elongation rate of 10 percent per minute. The elastic modulus is calculated from the increase in tension in the range between 0 and 0.5 percent.

The tensile strength and elongation at rupture are determined at a temperature of 23° C. and a relative humidity of 50 percent by means of an electronically recording tension tester. For this purpose, a sample strip having a width of 15 mm. and a clamping length of 100 mm. is stretched to the point of rupture at an elongation rate of 100 percent per minute.

The shrinkage is measured by means of a square sample having edges of 100 mm. length, which is immersed for 60 seconds in a triethylene glycol bath at 140° C. Thereafter, the dimensional changes are measured and stated as percentage of shinking.

The units of the copolymer consist of low molecular weight polymeric formaldehyde units, such as trioxane, with ethylene oxide incorporated therein either in a statistical distribution or in the form of blocks.

The melt indices $i_2$ of the copolymers, measured at 190° C., have values in the range of 1 to 20 g./10 min., preferably 1 to 5 g./10 min. Their melting points are within the range of 140 to 180° C., depending on the kind of copolymer used, and their densities range from 1.40 to 1.43.

End group stabilization is effected in known manner by esterification or etherification or urethanization of the semi-acetalic end groups. Alternatively, it may be effected by an alkaline hydrolysis, with formaldehyde being split-off down to the first comonomer unit having a stable primary OH group.

The invention relates further to a process for the preparation of a film of trioxane copolymers by a stenter stretching process, in which stretching is performed in two successive steps, preferably first in the longitudinal and then in the transverse direction, by extruding the copolymer at temperatures between 180 and 300° C., producing the film by cooling the melt on a roll having a surface temperature less than 150° C., stretching the film in the longitudinal direction at a stretching rate between 1:4 and 1:7 at temperatures between 140° C. and 170° C., cooling it, and then stretching the film in the transverse direction at a stretching rate between 1:4 and 1:10. Then, the film may be again heated, with tension, to a temperature between the melting point of the copolymer and a temperature which is 40° C. below this melting point, and then cooled, if this is desired in the interest of dimensional stabilization.

Figure 1B:
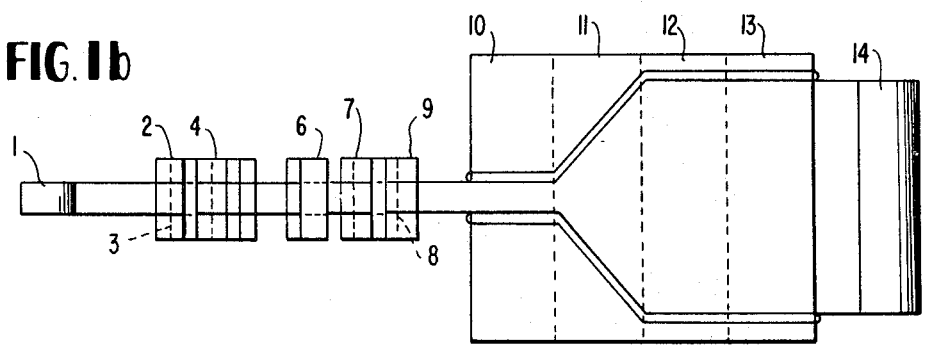
Figure 1C:
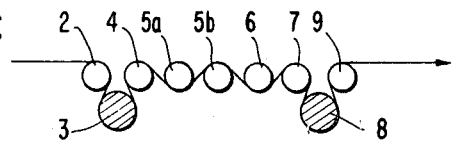

The process according to the invention will be described in the following with reference to FIGS. 1a to 1c which schematically show an apparatus for performing the process of the invention.

The unstretched copolymer film 1 to be biaxially stretched is fed into the first group of three rolls of a longitudinal stretching system, which consists of the two steel rolls 2 and 4 driven at a speed $v_1$ and a rubber roll 3 which is enveloped by the film and pressed against the steel rolls. Thereafter, the film passes through the pre-heating zone 5, which is maintained at a temperature $T_1$ by means of hot air of high velocity. Alternatively, preheating may be effected by contact with a sufficient number of rolls, as indicated in FIG. 1c, for example by the two rolls 5a and 5b heated to a temperature $T_1$. The film is then further heated by contact with roll 6 which has a surface temperature $T_2$. The rotational speed of this roll is higher than $v_1$ by the difference $\Delta v$. This difference in speed is sufficient to maintain the film near the yield stress within the preheating zone. The following steel rolls 7 and 9 are cooled and rotate at a rotational speed $v_2$. Between the rolls 7 and 9, the film envelops the rubber roll 8 which is pressed against them. The longitudinal stretching rate is determined by the quotient of velocity $v_2/v_1=\lambda_1$. The narrow gap between the rolls 6 and 7 represents the stretching zone. For transverse stretching, the cooled, longitudinally stretched film passes through a combined frame where it is laterally conducted by holding elements.

In zone 10, the film is pre-heated at an ambient temperature $T_3$. In zone 11, it is transversely stretched at an ambient temperature $T_4<T_3$. In the following zone 12, the heat-stability of the film is improved by heating the film under tension, the holding elements being led in a convergent path, if desired. In zone 13, the film is cooled, with tension, to a temperature below 40° C. At 14, the biaxially stretched film is wound up.

The invention will be further illustrated by reference to the following specific example:

EXAMPLE

The copolymer used for the preparation of the film consists of 95 percent of trioxane and 5 percent of ethylene oxide and has a density of 1.41 g./cm.$^3$ at 20° C. Its crystallite melting point is between 164 and 167° C. The copolymer was melted in an extruder at a temperature between 180 and 200° C. and formed into a crude film by cooling it on a metal roll having a surface temperature of 130° C. The apparatus just described in detail and shown in FIGS. 1a and 1b was used for stretching. The film to be stretched was 0.6 mm. thick and had a melt index $i_2=2.2$ g./10 min. at 190° C. (measured by ASTM method D 1238). The crude film was fed into the longitudinal stretching apparatus at a speed $v_1=2.0$ m./mm. In the preheating zone 5, which had a length of 6.7 m., the film was preheated by blowing it with hot air of high velocity at a temperature $T_1=162°$ C., and was then further heated to the stretching temperature by contact with a roll 6 of 260 mm. diameter, the surface of which had a temperature $T_2=164°$ C. Roll 6 was driven at a speed of 2.1 m./min., i.e. at a speed which was higher by 5 percent than the speed of rolls 2 and 4. Longitudinal stretching was effected in the gap between the heated roll 6 and the cooled roll 7. The latter had a peripheral speed $v_2=9$ m./min., so that a longitudinal stretching rate $\lambda_1=4.5$ resulted from the quotient of the two speeds. The longitudinally stretched film had a thickness of 0.18 mm. In the preheating zone of the transverse stretching device, which was maintained at a temperature $T_3=171°$ C., the longitudinally stretched film was heated up and then transversely stretched in the stretching zone at an ambient temperature $T_4=167°$ C. and at a stretching rate $\lambda_q=7.6$. In order to improve the thermal stability of the biaxially stretched film thus produced, the film was conducted under tension through the zone 12 at a temperature of 140° C. After the film had been cooled to about 30° C. within zone 13, it was wound up at 14. The stretched film, bordered by unstretched marginal zones, had a width of 700 mm.

The biaxially stretched film produced in accordance with this example had an average thickness of 0.024 mm. The sag characteristic of a flat film was 0.16 percent. The maximum deviation from the average thickness, measured across the width of the film, was less than ±5 percent. The ultimate tensile strength in the longitudinal direction was 21 kg./mm.$^2$ under a tensile stress of 48 percent, and 28 kg./mm.$^2$ in the transverse direction at 38 percent. The elastic modulus was 350 kg./mm.$^2$ in the longitudinal direction and 410 kg./mm.$^2$ in the transverse direction. The shrinkage, which served as a measurement of the dimensional stability of the film, was 3.5 percent in the longitudinal and 5 percent in the transverse direction at a temperature of 140° C.

It will be obvious to those skilled in the art that many modifications may be made within the scope of the present invention without departing from the spirit thereof, and the invention includes all such modifications.

What is claimed is:
1. A biaxially stretched film of a high-molecular weight linear trioxane/ethylene oxide copolymer having stabilized end groups and containing 80 to 99.9 percent by weight of trioxane, based on the total weight of the polymer, the film exhibiting a sag of less than 0.2 percent characteristic for a flat film, a deviation in thickness of less than ±6 percent from the average thickness, an elastic modulus in all directions of the film plane of at least 300 kg./mm.$^2$, an ultimate tensile strength above 15 kg./mm.$^2$ at an elongation at rupture of less than 100 percent, and a shrinkage capacity, at 140° C., of less than 5 percent.

2. A film according to claim 1 in which the copolymer contains 90 to 99.9 percent by weight of trioxane.

3. A process for the preparation of a biaxially stretched film of a high-molecular weight linear trioxane/ethylene oxide copolymer having stabilized end groups and containing 80 to 99.9 percent by weight of trioxane, based on the total weight of the polymer, which comprises extruding a melt of the copolymer at a temperature in the range of 180 to 300° C., producing a film by cooling the melt on a surface having a temperature below 150° C., longitudinally stretching the film at a temperature in the range of 140 to 170° C. and a stretching ratio between 1:4 and 1:7, cooling the film, and then stretching it transversely at a temperature in the range of 145 to 175° C. and a stretching ratio between 1:4 and 1:10.

4. A process according to claim 3 in which the biaxially stretched film is heated under tension to a temperature between the melting point of the copolymer and a temperature 40° C. below said melting point, and then cooled, whereby the dimensional stability of the film is improved.

References Cited

UNITED STATES PATENTS

| | | | |
|---|---|---|---|
| 3,027,352 | 5/1962 | Walling et al. | 260—67 |
| 3,373,234 | 3/1968 | Schnizer et al. | 260—67 |
| 3,377,261 | 4/1968 | Ancer | 264—210 |
| 3,385,826 | 5/1968 | Hermann et al. | 260—67 |
| 3,465,070 | 9/1969 | Smith et al. | 264—210 |
| 3,494,893 | 2/1970 | Häfner et al. | 260—67 |

FOREIGN PATENTS 723,536 12/1965 Canada.

JOHN T. GOOLKASIAN, Primary Examiner

G. W. MOXON II, Assistant Examiner

U.S. Cl. X.R.

161—402, 411; 260—67; 264—210, 289